United States Patent [19]

Katz

[11] Patent Number: 4,838,733
[45] Date of Patent: Jun. 13, 1989

[54] LANDFILL COMPACTION

[76] Inventor: Albert A. Katz, 707 N. Broad St., Elizabeth, N.J. 07208

[21] Appl. No.: 279,665

[22] Filed: Dec. 5, 1988

[51] Int. Cl.$^4$ ............................................... B09B 1/00
[52] U.S. Cl. ................................... 405/129; 210/603; 210/901; 405/271
[58] Field of Search ................. 405/36, 128, 129, 258, 405/271; 210/170, 603, 747, 901

[56] References Cited

U.S. PATENT DOCUMENTS

| | | | |
|---|---|---|---|
| 3,478,656 | 11/1969 | McDonald | 405/271 X |
| 4,376,598 | 3/1983 | Brouns et al. | 405/258 |
| 4,643,111 | 2/1987 | Jones | 405/129 X |
| 4,670,148 | 6/1987 | Schneider | 210/603 |
| 4,696,599 | 9/1987 | Rakoczynski et al. | 405/129 |
| 4,730,672 | 3/1988 | Payne | 210/901 X |

FOREIGN PATENT DOCUMENTS

| | | | |
|---|---|---|---|
| 3300464 | 7/1984 | Fed. Rep. of Germany | 405/129 |
| 3425785 | 1/1986 | Fed. Rep. of Germany | 405/128 |
| 3425788 | 1/1986 | Fed. Rep. of Germany | 405/128 |

Primary Examiner—David H. Corbin
Attorney, Agent, or Firm—Samuelson & Jacob

[57] ABSTRACT

A landfill compaction system and method reduces the volume of landfill at an existing landfill site by essentially sealing off at least a portion of the landfill and utilizing a source of vacuum to extract gases from the sealed-off portion of the landfill, the extraction taking place relatively rapidly so as to make use of the sudden impact of atmospheric pressure upon the sealed-off portion to assist in the compaction of the landfill.

16 Claims, 4 Drawing Sheets

LANDFILL COMPACTION

The present invention relates generally to the disposal of garbage and refuse and pertains, more specifically, to increasing the capacity of landfills to accommodate greater volumes of garbage, refuse or trash within the limits of available landfill areas.

It has long been the practice to dispose of garbage, refuse, trash and like matter in landfills located in areas designated specifically for that purpose. More recently, the availability of areas for landfills has diminished quite drastically, presenting acute problems in the disposal of garbage and like matter. In an effort to alleviate these problems, the capacity of existing landfills has been increased by compaction of the matter placed in the landfill. Such compaction has been carried out by apparatus which traverses the surface of the landfill to compress the landfill downwardly, primarily by virtue of the weight of the apparatus. The present invention provides apparatus and method by which the capacity of existing landfills can be increased dramatically, through compaction of the landfill over very large areas, as compared to previous compaction techniques, and attains several objects and advantages, some of which may be summarized as follows: Increases the capacity of existing landfills for conservation of landfill area; Provides a dramatic increase in landfill capacity, utilizing a relatively economical technique and apparatus, without increasing the area occupied by the landfill; Enables rapid compaction of a landfill over a relatively large area of the landfill; Attains increased capacity in a landfill by compaction of the matter in the landfill in a relatively short span of time so that the increased capacity becomes available without excessive delay; Utilizes apparatus having a relatively simple design and construction for economical manufacture and reliable operation; Accomplishes increased landfill capacity safely and with economy; Requires no elaborate facilities installed permanently at the landfill site; Enables the further use of existing landfills which heretofore were believed to have been filled to capacity; Enhances the quality of existing landfills by removal of unwanted gases and increasing the density of the landfill.

The above objects and advantages, as well as further objects and advantages, are attained by the present invention, which may be described briefly as a landfill compaction system and method for reducing the volume of a landfill located on the ground from a given original volume to a reduced volume, the given original volume of landfill having a defined perimeter and a surface within the perimeter, the surface normally being exposed to the ambient atmosphere and the landfill extending into the ground to a depth along the perimeter of the given volume, the reduction in volume being the result of the simultaneous sudden extraction of gases from the original volume and impact of the ambient atmosphere upon the surface of the landfill within the perimeter of the volume thereof, the system and method comprising means for and the steps of: essentially sealing the given original volume of landfill to a selected depth along the perimeter of the given original volume and over the surface of the given original volume surrounded by the perimeter; providing a source of vacuum; providing extraction passage means for penetrating the landfill, the extraction means including a plurality of extraction devices spaced apart throughout the landfill, within the perimeter of the essentially sealed original volume; interconnecting the extraction devices with the source of vacuum; and effecting a rapid opening of communication, through the conduit means, between the extraction devices and the source of vacuum, thereby to cause the sudden extraction of gases from the original volume, the simultaneous sudden impact of atmospheric pressure upon the surface within the perimeter of the landfill volume, and the concomitant compaction of landfill from the original volume to the reduced volume.

The invention will be understood more fully, while still further objects and advantages will become apparent, in the following detailed description of preferred embodiments of the invention illustrated in the accompanying drawing, in which.

Figure 1:
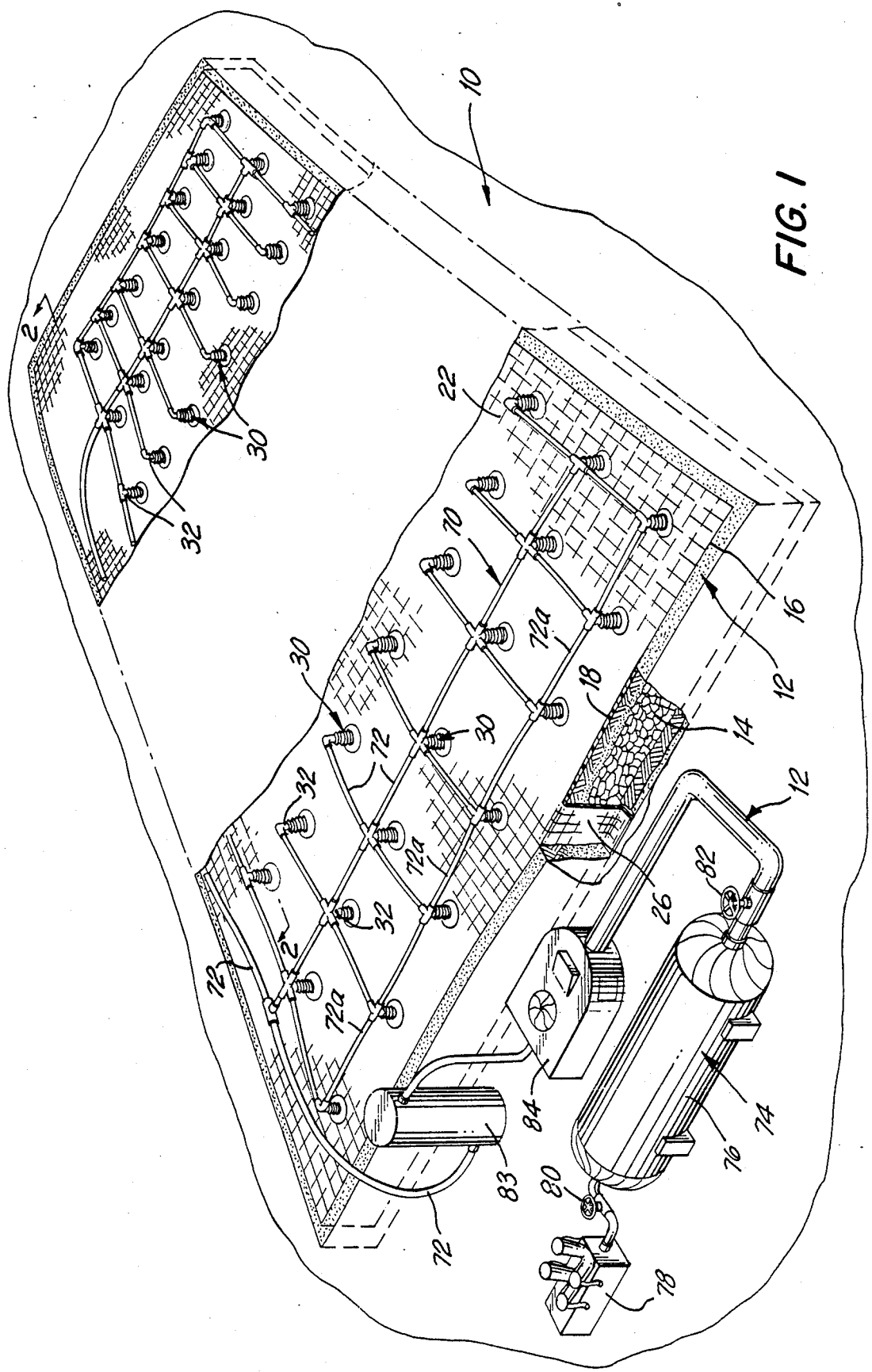
FIG. 1 is a somewhat diagrammatic, pictorial perspective view illustrating apparatus constructed in accordance with the invention and installed at a landfill site.
Figure 8:
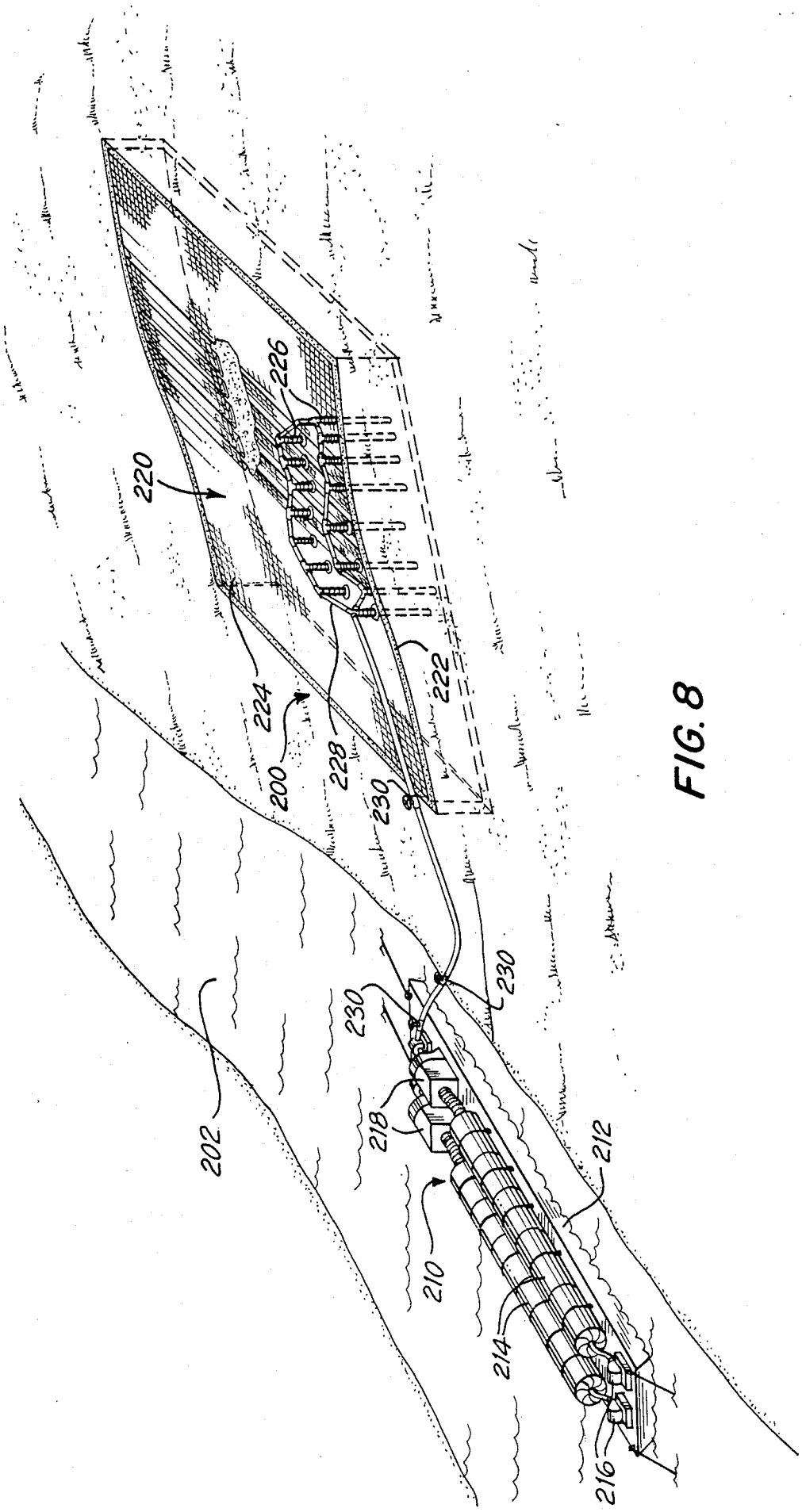

FIG. 8 a somewhat diagrammatic, pictorial perspective view similar to FIG. 1, and illustrating yet another embodiment of the invention.

Referring now to the drawing, and especially to FIG. 1 thereof, a landfill site is illustrated generally at 10 and is seen to occupy an extended area, all of which is not shown in the illustration. Ordinarily, such landfill sites receive refuse which is then covered with earth and, subsequent to some settling of the layers of refuse and earth, further layers of refuse and earth are added until the landfill reaches a maximum capacity and no longer can be utilized for the disposal of refuse. Since much of the refuse is in the form of such articles as hollow containers made of plastic and other materials, boxes constructed of paper and cardboard, sacks, bags and porous materials, all of which create pockets filled with air and other gases within the landfill, thereby increasing the volume of the landfill, various schemes have been proposed for compacting the refuse to reduce such pockets in a landfill and thus increase the capacity of a particular landfill to accept further refuse without a concomitant increase in the area of the landfill site. To this end, a landfill compaction system divised in accordance with the present invention is shown at 12 wherein a portion of the landfill site 10 is essentially isolated, or sealed off, from the remainder of the site to establish a given volume 14 of landfill defined by a fixed perimeter 16 and having a surface 18 within the perimeter 16. An essentially impermeable barrier 20 has been constructed within the landfill to establish the perimeter 16, and includes an essentially impermeable barrier sheet 22 which has been placed over the surface 18 and extends downwardly into a trench 24 to a selected depth to essentially seal the given volume 14 and isolate the given volume from the surrounding landfill at site 10.

Preferably, barrier 20 is put in place by digging the trench 24 to the selected depth in the landfill, draping the edge portions 26 of barrier sheet 22 into trench 24, and then filling the trench 24 with a dense fill 28, such as earth. The barrier sheet 22 preferably is in the form of a plastic sheet, the peripheral edge portions 26 of which are embedded in the trench 24 (also see FIG. 2) to close off the given volume 14.

Figure 2:
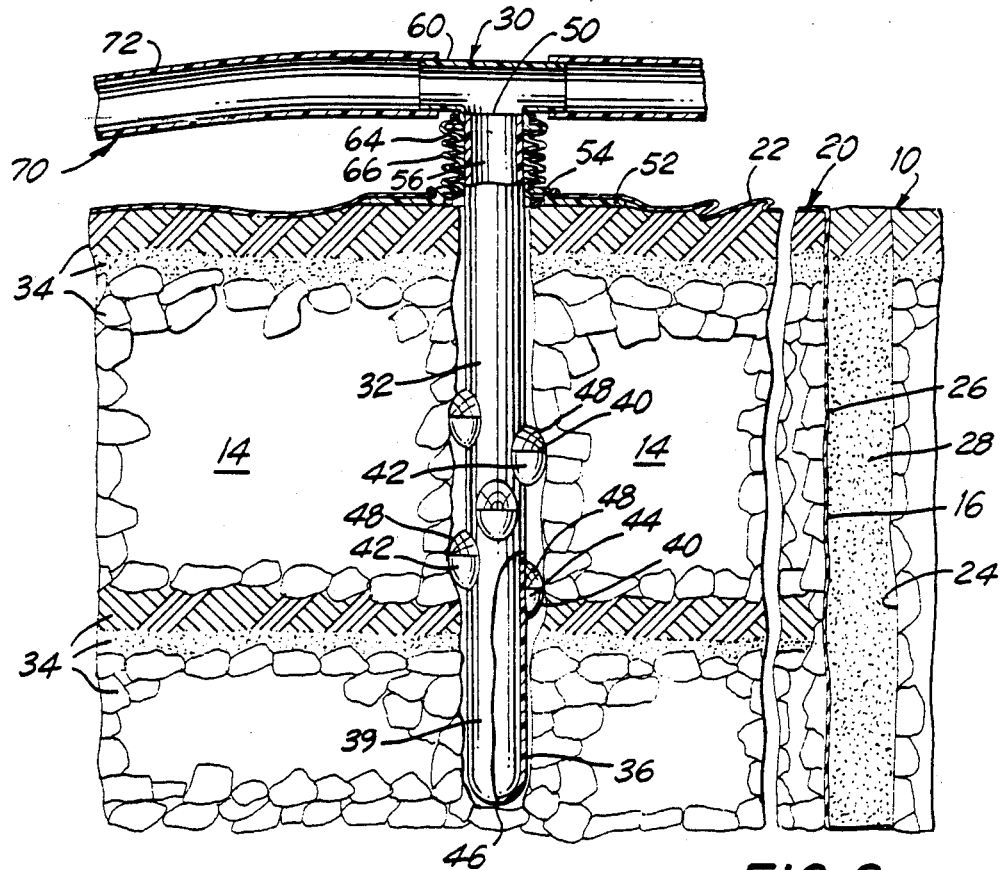
FIG. 2 is an enlarged, fragmentary cross-sectional view taken along line 2—2 of FIG. 1.

A plurality of extraction devices 30 are spaced apart throughout the landfill, within the perimeter of the sealed portion which constitutes the given volume 14, and include draw tubes 32 which penetrate the landfill and provide extraction passages, as will be described below. As best seen in FIG. 2, each draw tube 32 extends downwardly into the landfill volume 14, through several layers 34 of the landfill volume 14, and comprises a tubular member having a tubular wall 36 with perforations shown in the form of apertures 38 spaced axially along a lower portion 39 of tubular wall 36. Draw tubes 32 have been inserted into the material of the landfill volume 14 by driving each draw tube 32 into the landfill material, a procedure which is available at most landfill sites. A pouch 40 is associated with each aperture 38, the pouches 40 being oriented so as to provide a downwardly-facing curved shield 42 and an upwardly facing opening 44 communicating with each aperture 38. The lowermost end 46 of the draw tube 32 is rounded so as to facilitate penetration of the draw tube 32 into the landfill. During such penetration, the pouched construction at each aperture 38 assures that the draw tube 32 will penetrate the landfill without fouling of the apertures 38 by the materials in the landfill, especially when the draw tubes 32 are inserted into the landfill volume 14 by pushing the draw tubes 32 directly into the landfill material without first preparing a hole in the landfill material for the draw tube 32. Preferably, a screen 48 is placed over each opening 44 to assist in precluding such fouling, as well as to assure that the openings are not clogged during the subsequent operations which will now be described.

Figure 3:
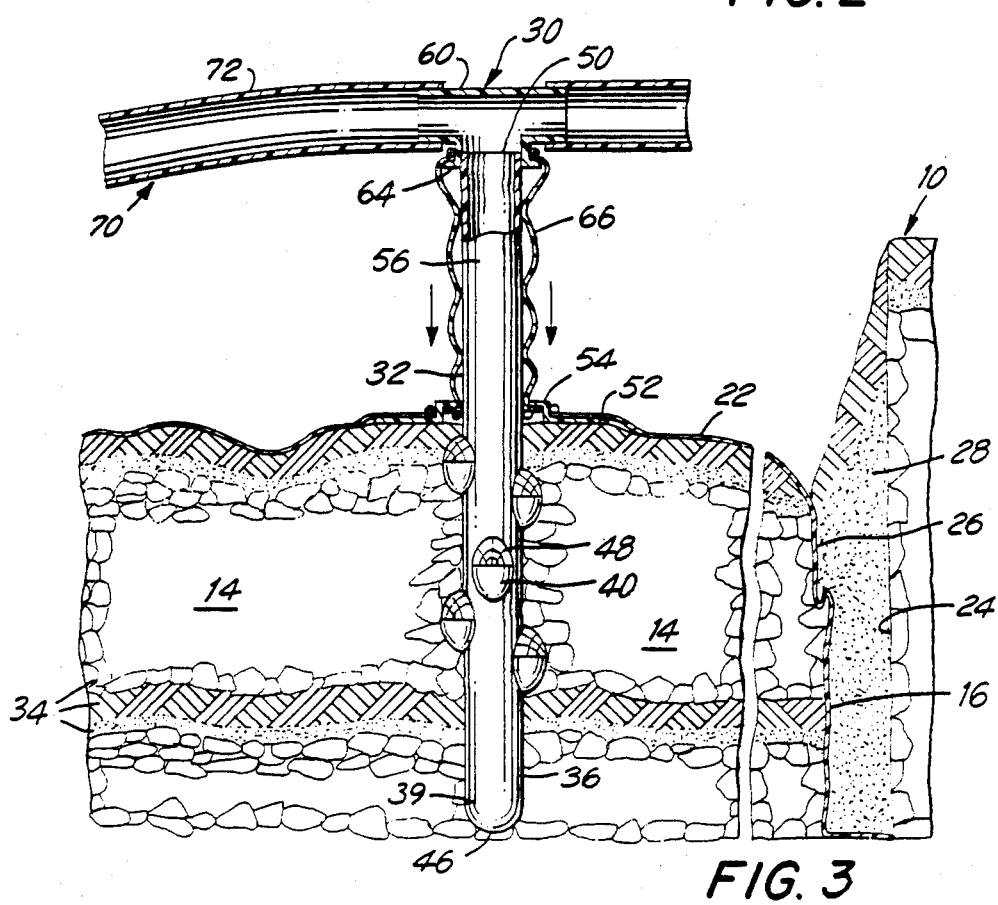
FIG. 3 is a view similar to FIG. 2, but with component parts in another operating position, illustrating a method carried out in accordance with the invention.

The uppermost end 50 of each draw tube 32 is located above the sheet 22 so that the draw tube 32 passes through the sheet 2. A sealing plate 52 is joined in gas-tight relationship to the sheet 22 at each draw tube location and includes a collar 54 which slides over an upper portion 56 of the draw tube 32. A fitting 60 is affixed to the uppermost end 50 of each draw tube 32 and includes a counterpart collar 64 integral with the fitting 60 and confronting collar 54. A sealing sleeve 66 has a bellows-like construction and is attached to the confronting collars 54 and 64 in gas-tight sealing relationship. As best seen in both FIGS. 1 and 2, a manifold arrangement 70 has a plurality of pipes 72 connected to the fittings 60 of the draw tubes 32 to provide conduit means interconnecting the draw tubes 32 with a source of vacuum 74, which source of vacuum includes a receiving tank 76 connected to a vacuum pump 78 through an exhaust valve 80. An inlet valve 82 is placed between the receiving tank 76 and the manifold arrangement 70, and preferably is connected to the manifold arrangement through a liquid separator 83 and an axial fan 84. With the exhaust valve 80 open and the inlet valve 82 closed, the vacuum pump 78 is operated to evacuate the receiving tank 76. While the capacity of he receiving tank 76 is relatively large, the capacity of the vacuum pump 78 need not be exceptionally large since the evacuation process can be accomplished over a longer period of time. Once the receiving tank 76 is evacuated, exhaust valve 80 is closed. Subsequently, inlet valve 82 is opened to effect communication between the draw tubes 32 and the receiving tank 76, through the manifold arrangement 70, thereby causing gases in the landfill volume 14 to be extracted from the landfill volume 14, through the draw tubes 32, to the receiving tank 76. At the same time, atmospheric pressure acting upon the surface 18 of the landfill volume 14, against the sheet 22, will compress the landfill material, as seen in FIG. 3, to compact the landfill volume 14 from the original volume, shown in FIG. 2, to the reduced volume, shown in FIG. 3.

Preferably, the inlet valve 82 is opened rapidly so as to cause a sudden impact of atmospheric pressure upon the sheet 22, and consequently upon the surface of the landfill volume 14, for forceful compaction of the landfill material. It is noted that additional pipes 72A (see FIG. 1), though unnecessary for satisfactory operation of the system 12, provide alternate routes for the extracted gases through the manifold arrangement 70, thereby resisting fouling of the manifold arrangement 70. Any liquids extracted through the draw tubes 32 are separated and held by the liquid separator 83. Once the pressure in the receiving tank 76 is essentially equalized with the pressure in the landfill volume 14, further compaction may be attained by subsequent operation of the axial fan 84 to continue to draw gases from the landfill volume 14 and to pass those gases to receiving tank 76 where the gases are compressed. In this manner, the gases in the receiving tank 76 may be compressed to multiple atmospheres, with the result that the receiving tank 76 is made to hold a volume of gas which, under atmospheric pressure, would occupy much more than the actual volume of the receiving tank 76. The inlet valve 82 is then closed and the compressed gases are stored for appropriate disposition.

In the illustrated typical installation, the landfill compaction system 12 includes seventy draw tubes 32 spaced from one another throughout a landfill volume 14 having an area of about one-hundred feet by one-hundred-fifty feet and a depth of about fifteen feet. The spacing between adjacent draw tubes 32 is approximately fifteen feet and the diameter of each draw tube 32 is six inches. Receiving tank 76 is provided with a volume of about 75,000 cubic feet. The system is capable of evacuating gases from the original landfill volume 14 rapidly enough so that in a matter of only a few minutes after opening the inlet valve 82 the landfill volume 14 is reduced by approximately one-third of the original volume of the landfill volume 14. Thus, as seen in FIG. 3, the surface of the landfill volume 14 has subsided by about five feet. The bellows-like sealing sleeve 66 accommodates such subsidence without compromising the integrity of the seal around the landfill volume 14.

Figure 4:
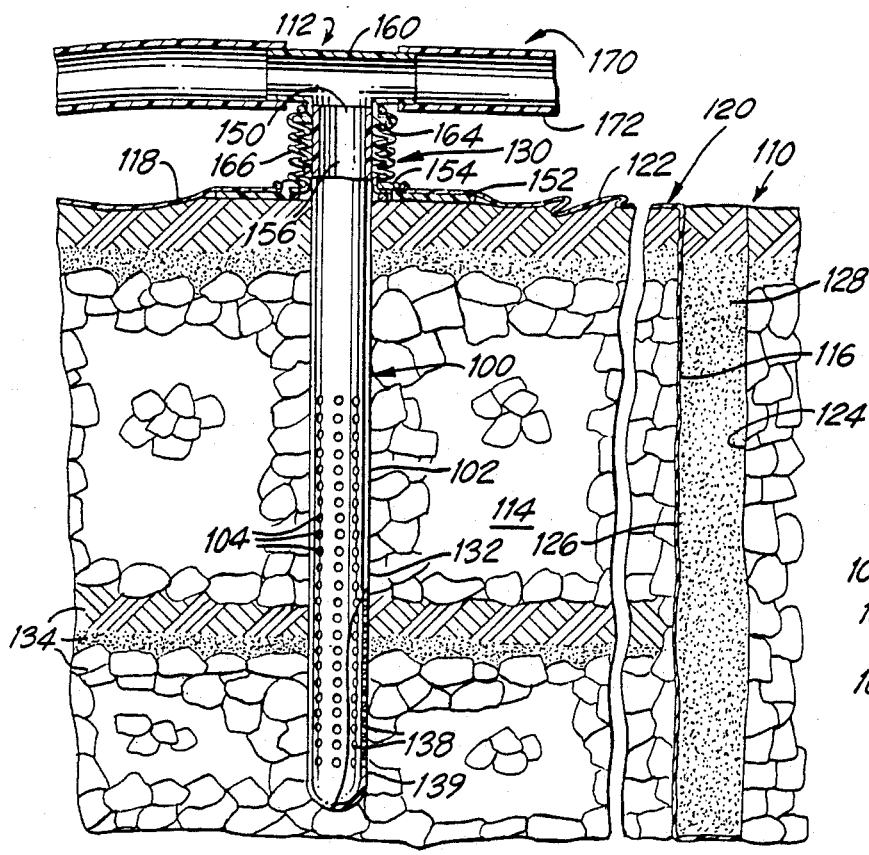
FIG. 4 is a fragmentary cross-sectional view similar to FIG. 2 and illustrating another embodiment of the invention.
Figure 6:
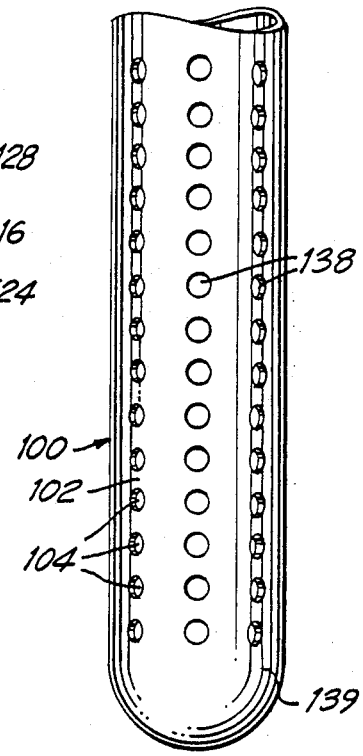
FIG. 6 is a fragmentary view of a component part of the embodiment of FIGS. 4 and 5.
Figure 5:
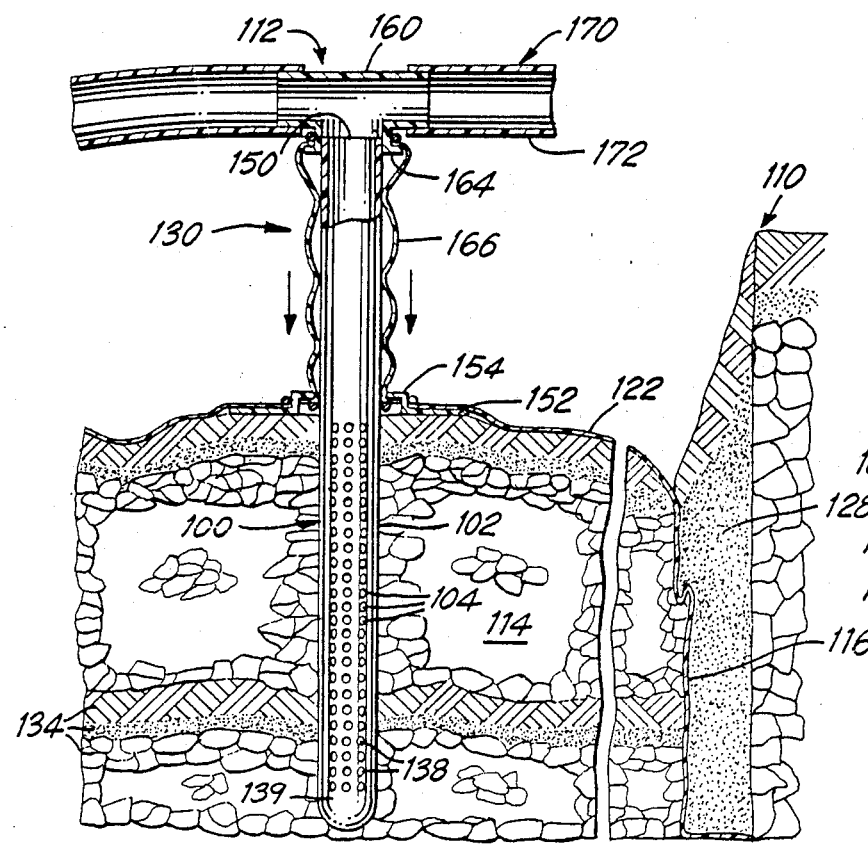
FIG. 5 is a view similar to FIG. 3, but showing the embodiment of FIG. 4.

Turning now to FIGS. 4, 5 and 6, another embodiment of the invention includes an alternate draw tube construction illustrated at 100 and seen to include a tubular wall 102 having a multiplicity of perforations 104 spaced along the tubular wall 102. As in the earlier-described embodiment of FIGS. 1 through 3, compaction system 112 is installed within a landfill site 110 and seals off a portion of the landfill site 110 to establish a given volume 114 having a perimeter 116 and a surface 118 within the perimeter 116. An essentially impermeable barrier 120 has been constructed within the landfill to establish the perimeter 116, and includes an essentially impermeable barrier sheet 122 which has been placed over the surface 118 and extends downwardly into a trench 124 to a selected depth to essentially seal the given volume 114 and isolate the given volume from the surrounding landfill at site 110, all as described in connection with the embodiment of FIGS. 1 through 3. Barrier 120 is put in place by digging the trench 124 to the selected depth in the landfill, draping the edge portions 126 of barrier sheet 122 into trench 124, and then filling the trench 124 with a dense fill 128, such as earth. The barrier sheet 122 is in the form of a plastic sheet, the peripheral edge portions 126 of which are embedded in the trench 124 to close off the given volume 114.

The draw tube construction 100 is only one of a plurality of extraction devices 130 spaced apart throughout the landfill, within the perimeter of the sealed portion which constitutes the given volume 114, and includes draw tube 132 which penetrates the landfill and provides an extraction passage, as will be described below. As best seen in FIG. 4, draw tube 132 extends downwardly into the landfill volume 114, through several layers 134 of the landfill volume 114, and comprises a tubular member including the tubular wall 102 and perforations 104, shown in the form of apertures 138 spaced axially along a lower portion 139 of tubular wall 102. Draw tubes 132 have been inserted into the material of the landfill volume 114 by driving each draw tube 132 into the landfill material, a procedure which is available at most landfill sites. The number and size of the apertures 138 is selected to provide the maximum area through which gases can flow from the landfill volume 114 into the extraction passage provided by the draw tube 132, without compromising the structural strength needed to withstand installation and operation of the draw tubes 132. A typical arrangement of apertures 138 is shown in FIG. 6. The total area of all of the apertures 138 is great enough to reduce the velocity of the flow of gases into each aperture 138 to a low value, while the volumetric flow rate into the draw tubes 132 is very high so that the full volume of extracted gases is accommodated with a very low entrance velocity at each aperture 138. The low entrance velocity reduces any tendency for fouling of the apertures 138 by debris from the landfill volume 114. Draw tubes 132 may be constructed of steel or of a synthetic resin material having the requisite strength to withstand both installation and use.

The uppermost end 150 of each draw tube 132 is located above the sheet 122 so that the draw tube 132 passes through the sheet 122. A sealing plate 152 is joined in gas-tight relationship to the sheet 122 at each draw tube location and includes a collar 154 which slides over an upper portion 156 of the draw tube 132. A fitting 160 is affixed to the uppermost end 150 of each draw tube 132 and includes a counterpart collar 164 integral with the fitting 160 and confronting collar 154. A sealing sleeve 166 has a bellows-like construction and is attached to the confronting collars 154 and 164 in gas-tight sealing relationship. As in the earlier-described embodiment, a manifold arrangement 170 communicates with a source of vacuum and includes a pipe 172 connected to each draw tube 132 so that the draw tubes 132 may be connected to the source of vacuum for compacting the landfill volume 114, in the manner described above. Thus, the system 112 is capable of evacuating gases from the original landfill volume 114 rapidly enough so that in a matter of only a few minutes after opening communication with the source of vacuum, the landfill volume 114 is reduced by approximately one-third of the original volume of the landfill volume 114. As seen in FIG. 5, the surface of the landfill volume 114 has subsided by about five feet. The bellows-like sealing sleeve 166 accommodates such subsidence without compromising the integrity of the seal around the landfill volume 114.

Figure 7:
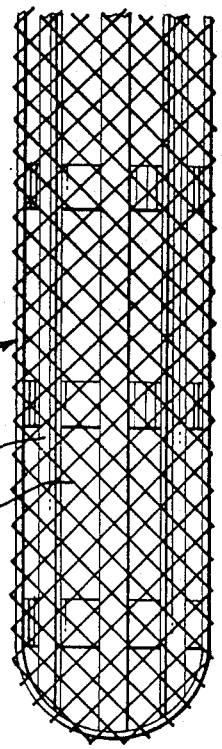
FIG. 7 is a fragmentary view illustrating still another embodiment.

A further alternate draw tube construction is shown in FIG. 7 wherein draw tube 180 is constructed in the form of a frame 182 over which there is placed a screen 184. The open structure of the frame 182 enables the passage of greater volumes of gas within a given time, while the screen 184 holds back the solid materials of the landfill. Draw tube 180 requires that a hole be prepared in the landfill prior to installation of the draw tube 180 to accommodate the draw tube 180, as opposed to the draw tube 132 which may be driven into the landfill without prior preparation. The relatively open structure of the draw tube 180 further reduces the velocity of the extracted gases as the gases enter the draw tube 180, thereby resisting fouling of the egress provided for the extracted gases. Moreover, should fouling occur, the open construction provides sufficient alternate paths for the egress of the extracted gases to assure that the gas flow is accommodated at reasonably low velocities.

Referring now to FIG. 8, a landfill site 200 is shown located along a waterway 202. Since many landfill sites are, in fact, located along waterways, the present invention provides a convenient arrangement for attaining compaction of landfill at such sites. Thus, landfill compaction system 210 is seen to include a barge 212 upon which is placed the source of vacuum of the system. In this manner, the source of vacuum can include very large receiving tanks 214 and the associated vacuum pumps 216 and axial fans 218, all of which are brought to the landfill site 200 with ease and economy. As described in connection with the embodiment of system 12, a landfill volume 220 is delineated within the landfill site 200 by a barrier 222 which includes a sealing sheet 224. A plurality of draw tubes 226 penetrate the landfill volume 220 and are connected to the source of vacuum through a manifold arrangement 228 and suitable valves 230. The use of the barge 212 not only increases the flexibility of use of the system 210 in connection with those landfill sites located adjacent a waterway, but facilitates the transportation of the extracted gases for suitable disposal.

It will be seen that the present invention provides method and means be which existing landfill sites may be utilized more effectively, with increased capacity, without a concomitant increase in the area occupied by the landfill. Further, the quality of the landfill itself is enhanced by removal of undesired gases and by an increase in the density of the landfill.

It is to be understood that the above detailed description of embodiments of the invention are provided by way of example only. Various details of design, construction and operation may be modified without departing from the true spirit and scope of the invention, as set forth in the appended claims.

The embodiments of the invention in which an exclusive property or privilege is claimed are defined as follows:

1. A landfill compaction system for reducing the volume of a landfill located on the ground from a given original volume to a reduced volume, the given original volume of landfill having a defined perimeter and a surface within the perimeter, the surface normally being exposed to the ambient atmosphere and the landfill extending into the ground to a depth along the perimeter of the given volume, the reduction in volume being the result of the simultaneous sudden extraction of gases from the original volume and impact of the ambient atmosphere upon the surface of the landfill within the perimeter of the volume thereof, the system comprising:

sealing means for essentially sealing the given original volume of landfill to a selected depth along the perimeter of the given original volume and over the surface of the given original volume surrounded by the perimeter;

a source of vacuum;

extraction passage means for penetrating the landfill, the extraction means including a plurality of extraction devices spaced apart throughout the landfill, within the perimeter of the essentially sealed original volume;

conduit means for interconnecting the extraction devices with the source of vacuum; and valve means for effecting a rapid opening of communication, through the conduit means, between the extraction devices and the source of vacuum, thereby to cause the sudden extraction of gases from the original volume, the simultaneous sudden impact of atmospheric pressure upon the surface within the perimeter of the landfill volume, and the concomitant compaction of landfill from the original volume to the reduced volume.

2. The invention of claim 1 wherein the source of vacuum comprises a large-capacity tank and means for exhausting gases from the tank.

3. The invention of claim 1 including compressing means located between the extraction devices and the tank for extracting further gases from the landfill volume, compressing the further gases and passing the compressed further gases into the tank.

4. The invention of claim 1 wherein the extraction devices each include a perforated tubular member for extending into the landfill, beneath the surface thereof.

5. The invention of claim 4 wherein the conduit means includes a manifold arrangement connecting the tubular members with the source of vacuum.

6. The invention of claim 5 wherein the source of vacuum comprises a large-capacity tank and means for exhausting gases from the tank.

7. The invention of claim 6 including compressing means located between the extraction devices and the tank for extracting further gases from the landfill volume, compressing the further gases and passing the compressed further gases into the tank.

8. The invention of claim 1 wherein the sealing means includes a pliable, essentially gas-impermeable sheet for spanning the surface of the landfill within the perimeter thereof.

9. The invention of claim 8 wherein the sheet includes peripheral edge portions extending downwardly into the landfill to the selected depth.

10. The invention of claim 8 wherein the source of vacuum comprises a large-capacity tank and means for exhausting gases from the tank.

11. The invention of claim 10 including compressing means located between the extraction devices and the tank for extracting further gases from the landfill volume, compressing the further gases and passing the compressed further gases into the tank.

12. The invention of claim 10 wherein the extraction devices each include a perforated tubular member for extending into the landfill, beneath the surface thereof.

13. The invention of claim 12 wherein the conduit means includes a manifold arrangement connecting the tubular members with the source of vacuum, and the gas-impermeable sheet is located between the manifold arrangement and the surface of the landfill spanned by the sheet.

14. The invention of claim 13 including compressing means located between the extraction devices and the tank for extracting further gases from the landfill volume, compressing the further gases and passing the compressed further gases into the tank.

15. A landfill compaction method for reducing the volume of a landfill located on the ground from a given original volume to a reduced volume, the given original volume of landfill having a defined perimeter and a surface within the perimeter, the surface normally being exposed to the ambient atmosphere and the landfill extending into the ground to a depth along the perimeter of the given volume, the reduction in volume being the result of the simultaneous sudden extraction of gases from the original volume and impact of the ambient atmosphere upon the surface of the landfill within the perimeter of the volume thereof, the method comprising:

essentially sealing the given original volume of landfill to a selected depth along the perimeter of the given original volume and over the surface of the given original volume surrounded by the perimeter;

providing a source of vacuum;

penetrating the landfill to establish a plurality of extraction passages spaced apart throughout the landfill, within the perimeter of the essentially sealed original volume;

effecting a rapid opening of communication between the extraction passage sand the source of vacuum, thereby to cause the sudden extraction of gases from the original volume, the simultaneous sudden impact of atmospheric pressure upon the surface within the perimeter of the landfill volume, and the concomitant compaction of landfill from the original volume to the reduced volume.

16. The invention of claim 15 including extracting further gases from the landfill volume and compressing the further gases.

* * * * *